United States Patent

Nagy

[15] 3,659,822
[45] May 2, 1972

[54] NON-SEIZING SLIDE VALVES

[72] Inventor: Joseph G. Nagy, Box 126, Yarbo, Saskatchewan, Canada

[22] Filed: Jan. 22, 1971

[21] Appl. No.: 107,750

[52] U.S. Cl.............................251/178, 251/148, 251/302, 138/94.5, 251/358
[51] Int. Cl............................................F16k 1/16
[58] Field of Search..................137/375; 251/148, 177, 178, 251/302, 358; 138/94.3, 94.5

[56] References Cited

UNITED STATES PATENTS

| | | | |
|---|---|---|---|
| 2,360,389 | 10/1944 | Bergman | 138/94.5 |
| 2,781,787 | 2/1957 | Johnson | 138/94.5 |
| 3,240,467 | 3/1966 | Caldwell | 251/177 X |
| 3,319,661 | 5/1967 | Shindler | 138/94.3 |

FOREIGN PATENTS OR APPLICATIONS 564,258  6/1957  Italy......................................138/94.5

*Primary Examiner*—Harold W. Weakley

[57] ABSTRACT

A non-seizing slide valve is disclosed including a valve body having first and second halves between which a lever actuated valve plate is pivoted for sliding between open and closed positions. First and second gaskets are disposed between the sliding valve plate and first and second valve body halves. Formed of flexible and resilient material, the two gaskets include inner and outer annular flanges that are reinforced by rigid rings embedded in the gasket flanges. The valve parts are held in assembled relationship by two through bolts having shanks encircled by compression coil springs that press the gaskets against the valve plate.

4 Claims, 2 Drawing Figures

Patented May 2, 1972
3,659,822
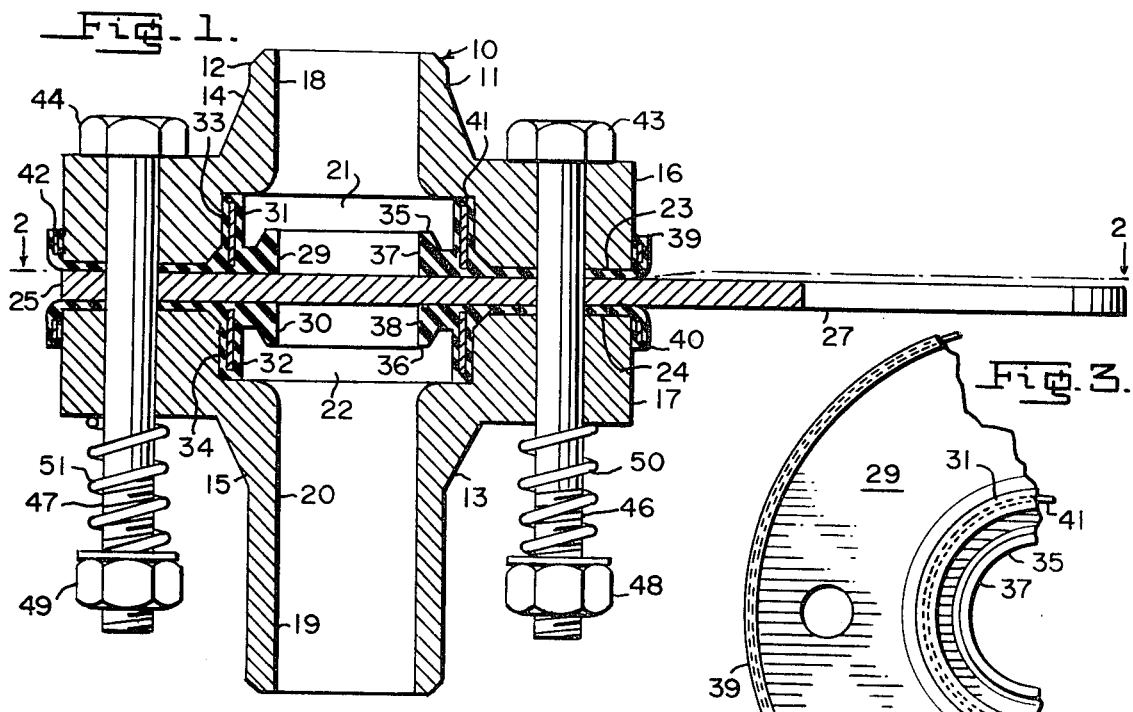
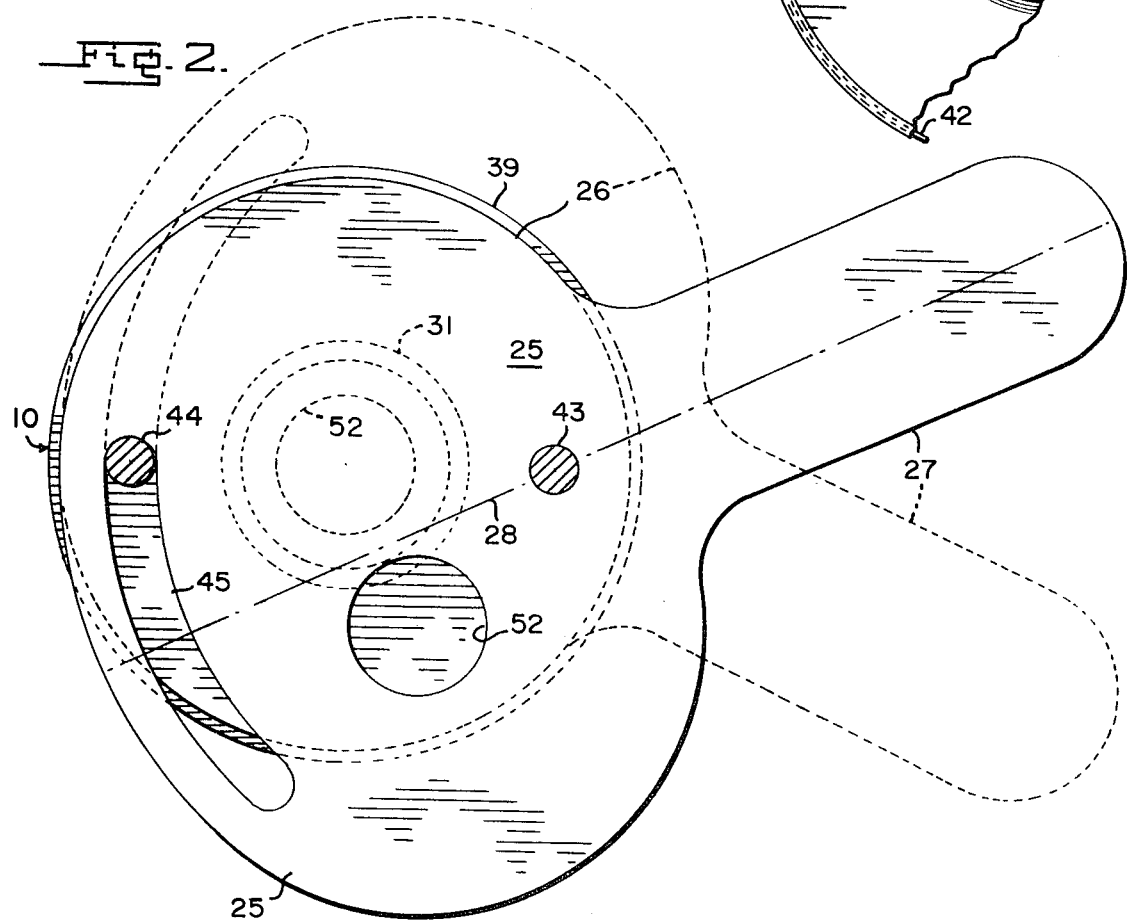

NON-SEIZING SLIDE VALVES

My invention relates to improvements in slide valves and more specifically to a lever actuated slide valve wherein the valve head has two sealing surfaces or seats.

An important object of my invention is the provision of a slide valve of the character just described having no completely internal moving parts and which is non-seizing, simple, and inexpensive but very effective and positive.

Another important object of my invention is the provision of a slide valve of the character described wherein the valve seats are flexible but have rigid reenforcing rings embedded therein.

Other objects and advantages of my invention will become apparent during the course of the following detailed description taken in connection with the accompanying drawing forming a part of this specification and in which drawing, FIG. 1 is a central longitudinal sectional view of the valve in its closed position.

FIG. 2 is a cross sectional view of the valve in its closed position, the view being taken substantially on the line 2—2 of FIG. 1 and showing by broken lines the relationship of parts when the valve is in its open position.

In the drawing which, for the purpose of illustration, shows only a preferred embodiment of my invention, and wherein similar reference characters denote corresponding parts throughout the views, the numeral 10 generally designates my improved non-seizing slide valve comprising a valve body 11 including first and second halfs 12, 13 each provided with a central hub 14, 15 and a circular outer flange 16, 17. Extending through the central hubs 14, 15 are coaxial or central openings 18, 19 aligning, when the valve 10 is assembled as shown in FIG. 1, to form a longitudinal passageway 20 through the valve body 11. The first and second halves 12, 13 are preferably provided with annular enlargements 21, 22 coaxial with the central openings 18, 19 forming said longitudinal passageway 20 and extending inwardly of the hubs 14, 15 from the inside surfaces 23, 24 of the first and second halves 12, 13 of the valve body 11. Disposed between the first and second halves 12, 13 is a slide plate 25 having an ellipsoidal main body portion 26 and a handle portion 27 projecting laterally preferably in the direction of the minor axis 28 of the ellipsoidal body portion 26. Disposed between said valve body halves 12, 13 and said slide plate 25 are first and second gaskets 29, 30 formed of a flexible and resilient material, said gaskets 29, 30 each including an inner annular flange 31, 32 fitting within said longitudinal passageway 20 and adjacent the circumferential surfaces 33, 34 of one of said annular recesses 21, 22. Said inner annular flanges 31, 32 of said gaskets 29, 30 further include inwardly projecting annular portions 35, 36 terminating in circumferential surfaces 37, 38 aligning with the walls of the longitudinal passageway 20 when the valve parts are disposed in their assembled relationship as shown in FIG. 1. Said gaskets 29, 30 also include outer annular flanges 39, 40 snugly encircling the respective circular outer flanges 16, 17 of said first and second half 12, 13 and I provide each gasket 29, 30 with rigid inner 41 and outer 42 reenforcing rings that are respectively embedded in the inner and outer flanges 31, 32, 39, 40 of each gasket 29, 30 as shown in FIGS. 1 and 3 of the drawings. Extending through the flanges 16, 17 of said first and second halves 12, 13 and through the gaskets 29, 30 and slide plate 25 are fasteners which, in the example shown comprise two through bolts 43, 44 disposed at diametrically opposite sides of the outer flanges 16, 17 and, from an inspection of FIG. 2, it will be seen that one of said through bolts 43, is adjacent the slide plate handle portion 27 and is located along the minor axis 28 of the ellipsoidal main body portion 26 of the slide plate 25. Also, it will be noted that the slide plate 25 is provided with an arcuate slot 45 generated by a radius of length equal to the distance between said through bolts 43, 44 and originating in the axis of the first mentioned through bolt 43. Each of said through bolts 43, 44 includes a threaded projecting shank portion 46, 47 provided with a nut 48, 49 and being encircled by a compression coil spring 50, 51. By this construction, threading the nuts 48, 49 inwardly or outwardly of the threaded shank portions 46, 47 increases or decreases the tightness of the gasket seal between the two halves 12, 13 of the valve body 11 and the sliding plate 25.

In the operation of my improved non-seizing slide valve 10, swinging of the handle 27 in a clockwise direction from the closed position shown in FIG. 2, will dispose the slide plate 25 in the broken line position of FIG. 2, whereupon the valve opening 52 in the slide plate 25 will shift from its full line position of non-alignment to its broken line position of alignment with the longitudinal passageway thus opening the valve 10. By my provision of gaskets 29, 30 with rigid reenforcing rings 41, 42, the surfaces of the gaskets 29, 30 under compression between the outer flanges 16, 17 of the valve body halfs 12, 13 will tend to resist creeping upon closing or opening sliding movement of the plate 25. It will be understood of course that the first and second halves 12, 13 of the valve body 11 may be provided with any suitable ending for connection of various kinds of pipes such as screwed or welded types.

I claim:

1. A slide valve comprising a body including first and second halves each provided with an outer flange and a central opening aligning to form a longitudinal passageway through the valve body, a slide plate disposed between said valve body halves, said slide plate having an opening and being slidable between positions of alignment and non-alignment of said opening with said longitudinal passageway, first and second gaskets disposed between said slide plate and said first and second halves, at least one of said gaskets including an inner annular flange fitting within said longitudinal passageway and having a rigid reenforcing ring embedded in said annular flange, fasteners extending through the flanges of said first and second halves, the first and second gaskets, and said slide plate, said fasteners holding said valve in assembled relation.

2. A slide valve as defined in claim 1, in which at least one of said outer flanges of the valve body halfs is circular, and said one gasket includes an outer annular flange snugly encircling said one outer flange of said valve body half.

3. A slide valve as defined in claim 1, in which said inner annular flange includes a further inwardly projecting annular portion terminating in a circumferential surface.

4. A slide valve as defined in claim 1, in which at least one of said fasteners is a through bolt having a threaded projecting shank portion provided with a nut, said projecting shank portion being encircled by a compression coil spring.

* * * * *